June 9, 1936. E. H. RAYMOND 2,043,595
APPARATUS FOR CONVEYING FEED IN POULTRY HOUSES
Filed Dec. 11, 1933 3 Sheets-Sheet 1
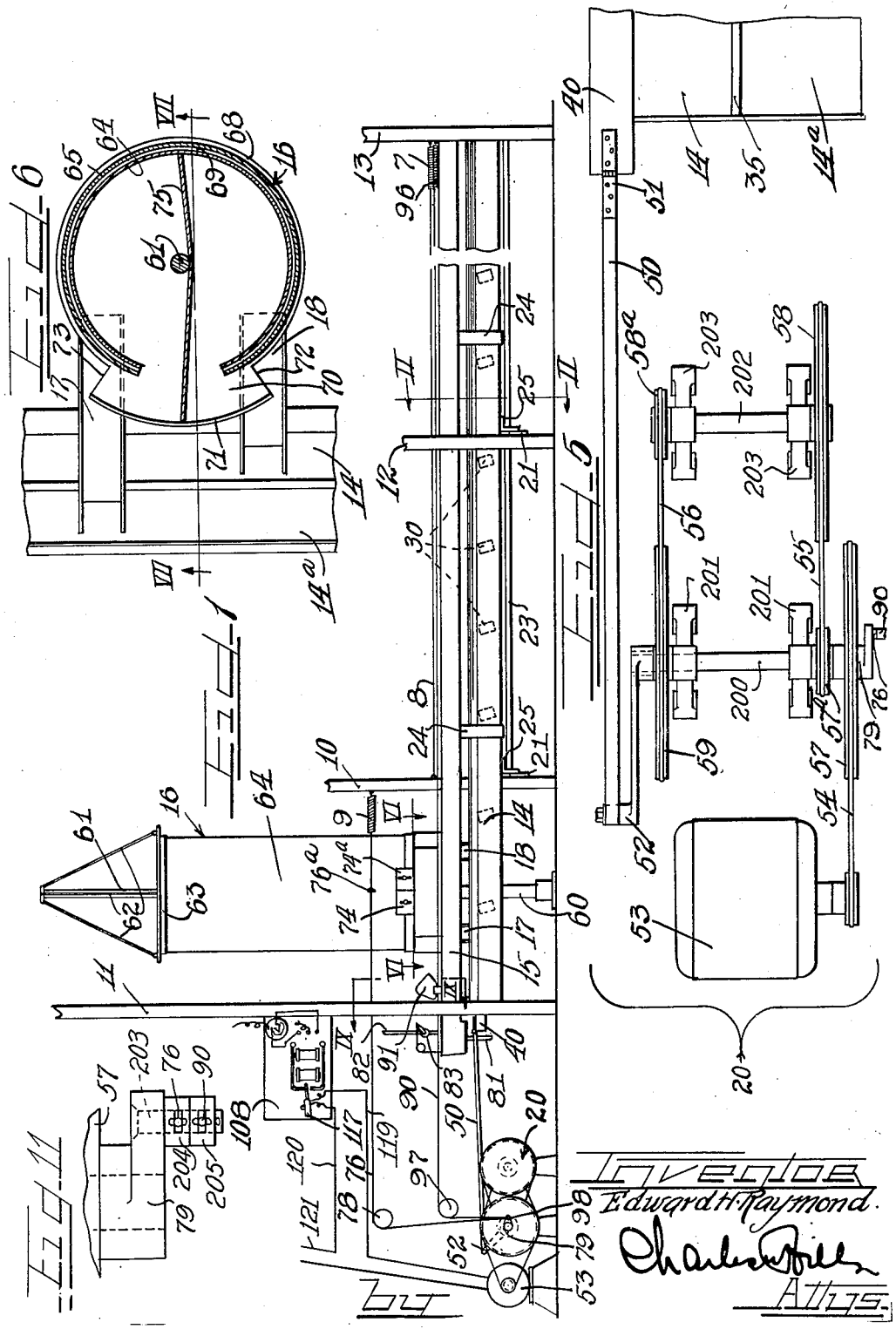

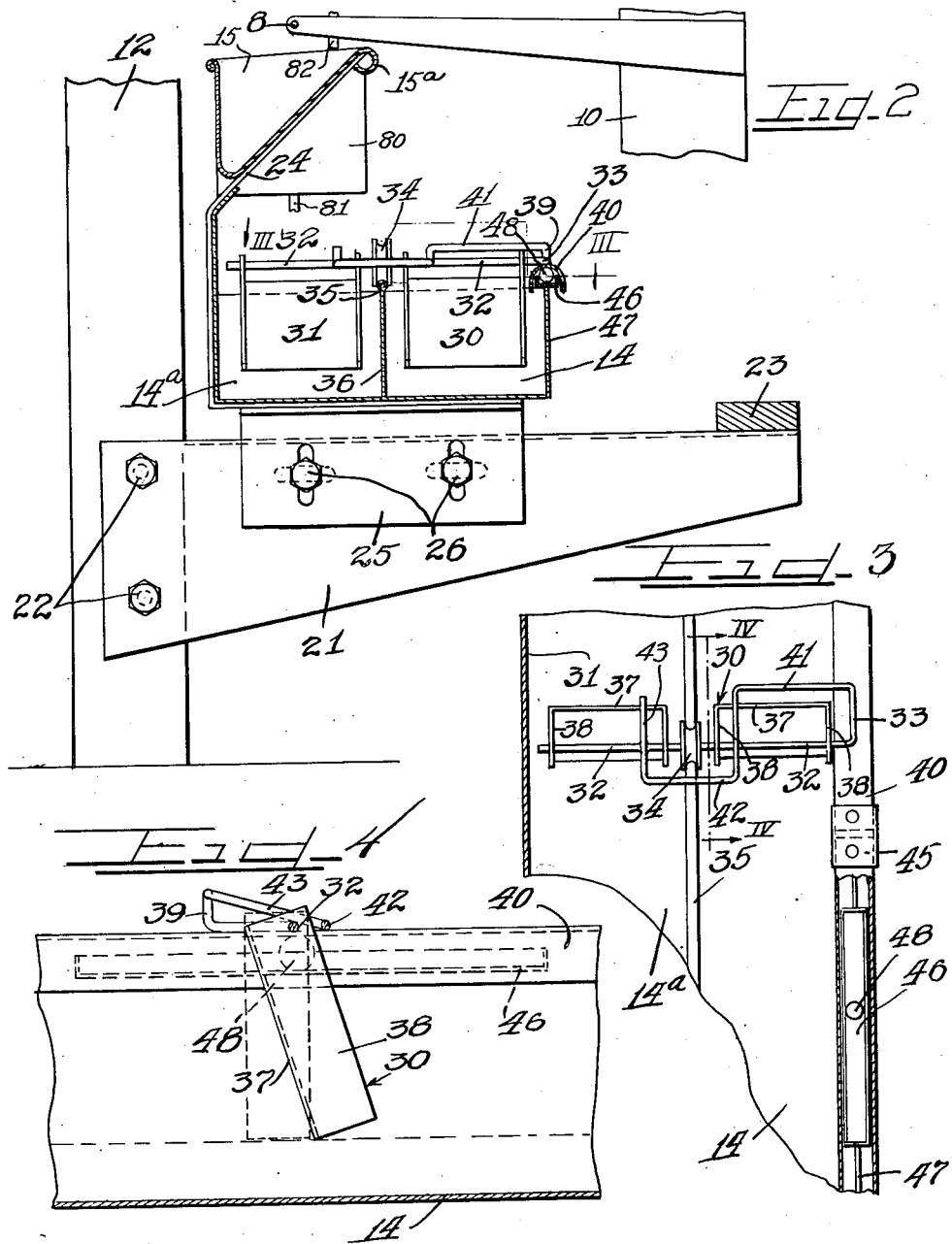

June 9, 1936.  E. H. RAYMOND  2,043,595
APPARATUS FOR CONVEYING FEED IN POULTRY HOUSES
Filed Dec. 11, 1933  3 Sheets-Sheet 3
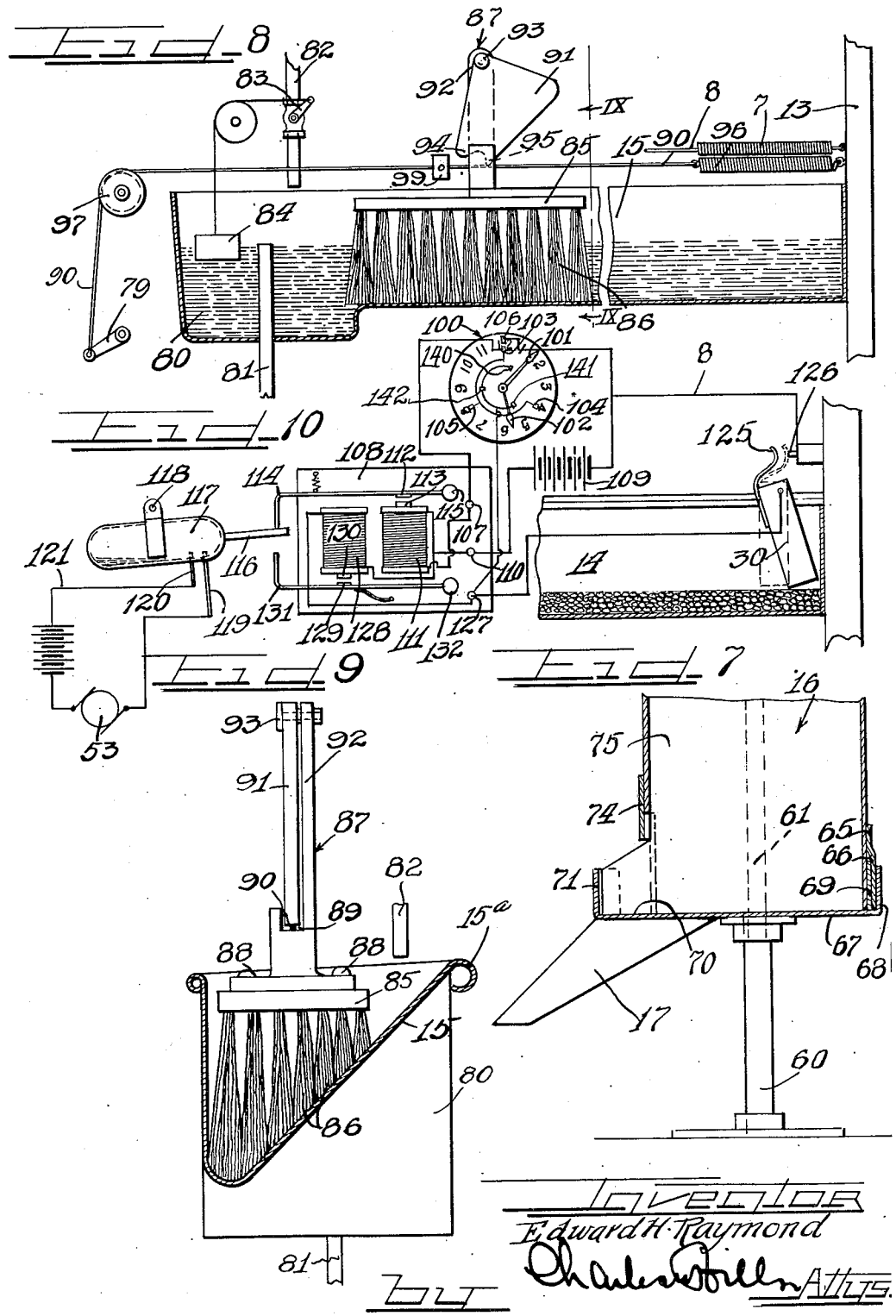

Patented June 9, 1936

2,043,595

UNITED STATES PATENT OFFICE 2,043,595

APPARATUS FOR CONVEYING FEED IN POULTRY HOUSES

Edward H. Raymond, Reading, Mass.

Application December 11, 1933, Serial No. 701,790

10 Claims. (Cl. 119—51)

This invention relates to a feeding device for distributing food and drink uniformly throughout the pens in animal houses.

More specifically, this invention relates to an apparatus for automatically distributing feed and water through a chicken house and includes an automatically cleaned water supply system.

The problem of scientifically feeding animals, such as poultry, on a large scale involves considerable manual attention and requires the services of an attendant during each feeding. For example, on farms devoted primarily to egg production, it is customary to house the laying hens in long narrow buildings and since these hens should be fed with as much fresh feed as they will eat at short but regular time intervals, it is evident that the distributing of the food through each house or pen involves an enormous amount of routine labor.

In my copending application, Serial No. 676,249, filed June 17, 1933, I have described and claimed a feeding system for a battery laying cage in which the cages are positioned in a plurality of horizontally-arranged tiers. I have now provided an improved feeding system which is especially adapted for use in long, narrow houses or pens in which the hens may be corralled on the floor in large groups or segregated in individual cages. The feeding device is preferably placed along the window side of the long, narrow house.

My improved distributing system includes automatic time controlled means which starts the mechanism in operation at predetermined intervals and shuts off the mechanism when a sufficient amount of food has been distributed to the points farthest away from the feed supply. The device also includes a safety stopping mechanism which is brought into operation after the device has run for a predetermined time in the event that the other stopping mechanism does not function.

It is, therefore, an object of this invention to provide an apparatus for automatically distributing feed to animals housed in enclosures.

Another important object of this invention is to provide a novel feeding device for uniformly distributing fresh feed to animals at predetermined intervals of time.

Another important object of this invention is to provide a novel feed hopper for supplying feed to the distributing system and for regulating the proportion of ingredients in the feed supplied.

Another important object of this invention is to provide a control device for automatically starting a feed distributing apparatus at predetermined times and for stopping the apparatus after sufficient feed has been distributed throughout the system or after a predetermined time interval.

Other and further objects of this invention will be apparent from the following description and the accompanying drawings which form a part of this specification.

This invention (in a preferred form) is illustrated on the drawings and hereinafter more fully described.

On the drawings:

Figure 1 is a diagrammatic, front elevational view of a feed distributing system embodying the principles of this invention.

Figure 2 is an enlarged vertical cross-sectional view taken substantially along the line II—II of Figure 1.

Figure 3 is a fragmentary top view, with parts in cross-section, taken substantially along the line III—III of Figure 2.

Figure 4 is a fragmentary vertical section view, taken substantially in the plane of line IV—IV of Figure 3, showing the manner in which the feed pusher paddles are mounted in the feed troughs.

Figure 5 is an enlarged plan view of the driving mechanism for the apparatus.

Figure 6 is a horizontal cross-section taken substantially along the line VI—VI of Figure 1.

Figure 7 is an enlarged fragmentary sectional view taken substantially along the line VII—VII of Figure 6.

Figure 8 is an enlarged broken vertical longitudinal-section of the water trough and cleaning apparatus.

Figure 9 is an enlarged detail view taken substantially along the line IX—IX of Figures 1 and 8, with parts in section.

Figure 10 is a diagrammatic view of the automatic control devices for starting and stopping the feeding apparatus.

Figure 11 is a fragmental view of one manner of connecting the operating wires to the crank arm.

As shown on the drawings:

In Figure 1, the reference numerals 11, 12, and 13 indicate vertical supports for a long, narrow poultry house, such as are usually positioned along the window side of the house. As will be hereinafter described, these supports carry horizontal arms to which are secured feed and water troughs 14, 14a, and 15, respectively, of the feed distribution system. These troughs extend through the length of the pen between the supports 10 and 13, Figure 1 of the house devoted to the housing of the poultry and are disposed above the floor but within reach so that a hen can easily hop onto a feeding perch also carried by the arms.

A feed hopper 16 supplies feed to the troughs 14 and 14a through chutes 17 and 18 (Fig. 6). As will be more fully hereinafter described, the feed hopper 16 is operated by the driving mechanism indicated generally at 20.

As shown in Figure 2, the feed distributing troughs are secured, by means of plates 25, to horizontal arms 21 which are bolted or otherwise secured to the vertical supports such as 12, as at 22. The horizontal arms 21 support a feeding perch 23.

The two feed troughs 14 and 14a permit the supplying of two different kinds of feed to the hens or animals in the house. Obviously, one or any number of troughs may be used.

As shown in Figure 2, a water trough 15 is supported above the feed troughs 14 and 14a by hooking its flanged edge 15a over metal straps 24. The straps 24 extend around and underneath the feed troughs and are secured to the fastening plates 25. The plates 25 are bolted to the horizontal arms 21 by means of bolts 26. The plates 25 are provided with vertical slots, and the arms 21 with horizontal slots to permit alignment of the troughs in operating position.

A plurality of pusher paddles, such as the paddles 30, are placed in the trough 14 at spaced intervals for advancing the feed through this trough. A number of pusher paddles 31 are likewise suspended at spaced intervals in the trough 14a.

The paddles 30 and 31 are pivotally suspended from hangers, such as the wires or rods 32, which extend across the troughs 14 and 14a and are secured at one end 33 thereof to a draw bar 40 which will be more fully hereinafter described.

To provide additional support for the paddles, the supporting wires or rods 32 may be occasionally reinforced at the centers thereof by means of rollers 34 adapted to roll on a track 35 formed on top of the wall 36 between the troughs. Rollers 34 need not be placed on each wire 32 since I have found that rollers placed at intervals of 10 feet afford ample support. The rollers 34 are preferably grooved as shown, to follow the track 35.

The paddles 30 and 31 each consists of a flat back portion 37 and sides 38 extending at right angles therefrom. The paddles swing freely from their pivotal mountings on the wires 32 and terminate short of the bottom of the troughs, as shown in Figures 2 and 4. The swinging movement of the paddles 30 and 31 is limited by stop members which are formed from extensions of the pivotal wires 32. Thus, as shown in Figures 2, 3, and 4, a portion of the supporting wire 32 is secured to the draw bar 40 as at 33 and then is bent upwardly as at 39 (Figures 2 and 4) and then at right angles to form an arm 41 (Figures 2 and 3). A U-shaped portion 42 (Fig. 3) is formed at the end of the arm 41. These portions 42 are bent downwardly as shown at 43 in Fig. 4 and are adapted to contact the backs 37 of the paddle members 30 and 31 as they swing upwardly in a forward movement, i. e., counter-clockwise (Fig. 4) and are also adapted to contact the top edges of the paddle members as they swing backwardly, i. e., clockwise (Fig. 4). It is thus apparent that the paddle members can swing forward into contact with the members 42 while their backward swing is limited to a substantially vertical position since the top edges of the paddles contact the portions 43 of the wires 32. This restriction of the pivotal movement of the paddles causes them to push feed forward, i. e., to the right, as viewed in Fig. 4, and downwardly, as viewed in Fig. 3 but prevents the feed from being pushed backward, since the paddles will, after reaching the end of their forward stroke, discharge their loads and ride on top of the feed during the backward stroke of the bar 40. The forming of the stop members from extensions of the supporting wires 32 reinforces the supporting members and adds rigidity to the structure.

The draw bar 40 to which the paddle supporting members are secured comprises arcuate shaped metal strips as shown in Figure 2 which are preferably formed in 10-foot sections. The portions may be readily secured together by splices, such as shown at 45 in Figure 3.

The draw bar 40 may be slidably mounted on the trough 14 in any suitable manner although I prefer to form rectangular boxes 46 on the top edge of a side 47 of the trough 14. These boxes 46 are open at the top and form runways or tracks for balls, such as is shown at 48. The draw bar is supported on the balls, and as the same is moved, the balls roll in the boxes 46 thereby forming anti-friction supports for the draw bar.

The draw bar is moved back and forward over the tracks to impart the described oscillatory driving motion to the paddles 30 and 31. The oscillating movement is imparted through a pitman 50 which is hinged to the adjacent end of the draw bar 40 at 51 (Fig. 5) and is driven by a crank-arm arrangement which, as shown, consists of a crank-arm 52 driven by an electric motor 53 through a system of belts 54, 55, and 56 which drive pulleys 57, 58, and 59 as shown.

The pulleys 57 and 57a are freely rotatable on a supporting shaft 200 and are keyed to each other. Pulleys 58 and 58a are keyed to shaft 202. Pulley 59 is free on shaft 200 and is keyed or otherwise connected to the crank arm 52.

The shaft 200 is supported in journals 201 while the shaft 202 is supported in journals 203.

It should be understood, however, that any other suitable drive mechanism, such for example, as reduction gears, may be used to drive the crank arm 52.

The feed supply tank 16, as shown in Figures 1, 6, and 7 may be screened off from the animals by a wall supported by the support 10 and consists of a stand 60 supporting a rod 61 which extends upwardly through the center of the tank.

Hopper 16 consists of a vertically disposed cylindrical tube 64, suspended by chains 62 attached to a central upright or rod 61. A bottom for the hopper comprises a plate 67, supported on stand 60. It will thus be apparent that the member 64 is suspended in a hanging relation from the top of the supporting rod 61. If desired, the chains 62 may be omitted and the cylinder 64 allowed to ride on a base member 67 supported by the stand 60. Vertical position of the cylinder may be maintained by positioning collars around the rod 61 and secured to the cylinder.

A collar 65 (Fig. 7) is secured around the bottom of the tube 64, and has an offset portion 66 spaced from the cylinder wall. The base member 75

67 has an upturned vertical flange 68 for fitting around the offset portion 66 of the collar 65. A strip 69 is secured to the base 67 in spaced relation to the flange 68 and is adapted to enter the space between the tube 64 and the off-set portion 66 of the collar 65. This construction provides a seal between the vertical tube 64 and the base 67 and at the same time permits oscillation of the cylinder relatively to the base.

A segment of the base 67 extends beyond the tube wall 64 to form a platform 70 (Fig. 6) with a front upstanding wall 71 and open ends 72 and 73. The tube wall 64 is apertured so that the interior of the cylinder is opened to the platform 70 as shown in Figure 6.

A separating wall 75 (Fig. 6) extends throughout the length of the tube 64 and has an additional portion extending through the aperture to the wall 71 of the platform 70. Adjustable doors 74 and 74a (Figs. 1 and 7) are provided to vary the size of the discharge openings in the tube wall 64.

The openings 72 and 73 at the ends of the platform are positioned over the feed chutes 18 and 17 so that material falling from the ends is moved through the chutes to the feed troughs. The tube 64 of the tank 16 is secured to a wire or rope 76 at 76a as shown in Figure 1. One end of the wire 76 is fastened to a coil spring 9 held by a vertical support 10, while the other end of the wire 76 is trained over a roll 78 and is secured to a collar 204 on pin 203 of the crank-arm 79 of the driving mechanism 20. The crank arm 79 is secured to the pulley 57 in rotative relation, and is provided with a pin 203 on which are rotatably mounted collars 204 and 205. One end of the wire 76 is connected to the collar 204 while one end of the wire 90 is connected to the collar 205. As the crank-arm 79 is rotated through its descending arc, the wire 76 is moved away from the support 10 thereby stretching the coil spring 9. When the arm 79 is rotated upwardly the spring 9 pulls the wire toward the support. This reciprocal action of the wire oscillates the tube 64 and material within the cylinder is pushed outwardly off of the ends 72 and 73 of the platform 70 by the separating wall 75 which serves as a pusher plate since it rotates with the cylinder. The doors 74 and 74a can be set to properly proportion the ingredients forced out of the tube. This feature is important when one feed trough only is used because it permits a proper ratio of ingredients to be fed to the animals.

The water trough 15, as described above, is superimposed above the feed troughs 14 and 14a. One end of the trough 15, such as the end near the feed hopper, is provided with a depressed or sump portion 80. A drain or overflow pipe 81 extends into this sump portion 80 as shown in Figure 8.

Water is introduced to the trough at the sump end by means of a water pipe 82 and valve 83 controlled by a float 84. When the liquid level falls, the float falls and opens the valve 83 allowing additional water to enter the trough.

The water trough cleaning apparatus, which forms a part of this invention, comprises a brush 85 having bristles 86 extending into the trough for contacting the inside walls thereof. The brush 85 is secured to a member 87 by means of bolts or other fastening means 88 (Figure 9). The member 87 contains a notched recess 89 for forming track means to guide the brush along a wire track 90 which will be hereinafter more fully described. A swinging latch member 91 is oscillatably mounted on the top of a vertical arm 92 of the member 87 by a pivot 93. The latch member 91 is provided at its bottom with two rounded portions 94 and 95, as shown in Figure 8, and one corner of the latch member extends away from the pivot point 93 so that the portion 95 is normally maintained in a vertical position for gripping the wire 90.

The wire 90 is secured at one end to a spring 96 which is fastened to the supporting means 13 at the end of the trough. The other end of the wire 90 is trained around a guide roll 97 and secured to a collar 205 on pin 203 of the crank-arm 79 which, as shown in Figure 5, is part of the driving mechanism 20.

The crank-arm 79, during half of its stroke, pulls the wire 90 toward the sump end of the trough and elongates the spring 96. The portion 95 of the latch member on the brush-supporting member 87 tightly engages the wire during this movement and the brush is thereby moved towards the sump end of the trough. During the other half of the crank-arm stroke, the spring 96 draws the wire 90 backwardly toward the support 13. However, during this backward movement, the latch member 91 is unlocked and the wire moves freely under the portion 94 of the latch member. Thus, the brush is moved in one direction only and during each complete revolution of the crank-arm advances a fixed distance toward the sump end of the trough.

As shown in Figure 9, the brush bristles 86 contact the sides and bottom of the trough 15 thereby brushing all foreign matter in the water trough down to the sump end thereof. The sump portion can be readily cleaned by the attendant whenever cleaning is necessary. After the brush has reached the sump end of the trough the latch member 91 contacts a stop 99 thereby disengaging the brush support from the wire. Before the brush is next placed in operation it must be manually moved to the other end of the trough, i. e. to the right, Fig. 8.

To prevent the hens from roosting on the water trough, I have provided an anti-roosting wire 8 over the trough. One end of this wire is secured to the support 10 (Figs. 1 and 2) while the other end is secured to a coil spring 7 which in turn is fastened to the support 13.

From the above description, it is evident that I have provided a feed and water distributing system which is operated by a single motor. The feed hopper is rotated to supply two different kinds of feed to the troughs 14 and 14a through chutes 18 and 17. The feed is advanced through the troughs by pusher paddles which are actuated by a draw bar slidable over one edge of the troughs. It is obvious that in some installations only one feed trough will be used. As shown on the drawings, the device can be formed so that, for example, in feeding chickens, the scratch and mash feed can be dispensed and regulated separately, or mixed together.

Since the pusher paddles do not contact the bottoms of the feed troughs, it is evident that a predetermined amount of feed will remain in the bottoms of the troughs while the excess feed will be advanced to the ends of the troughs, thereby distributing uniform amounts of feed throughout the length of the animal house. The paddles are so pivotally mounted in the troughs that they assume a vertical position during their pushing stroke and advance any feed piled higher than their bottom levels. The return stroke does not move the feed since the paddles ride on top of the advanced feed pile, thereby not disturbing these advanced piles.

In Figure 10 I have shown an electrical control device for my apparatus in which a time clock sets the apparatus in motion every four hours and in which an automatical stopping device shuts off the motor when the proper amount of feed has been distributed throughout the trough. A safety stop device is also provided to stop the motor after a one-hour run in the event that the feed operated stop fails to function.

As shown in Figure 10, a 12-hour time clock 100 is provided with the usual minute and hour hands 101 and 102, respectively. Three contact points 103, 104, and 105 for the hour hand 102 are provided at the 12, 4, and 8 marks on the clock face, respectively. A fourth contact point 106 is also provided at the 12-mark on the clock face for contacting the minute hand 101.

The contact points 103, 104, and 105 are connected with one binding post 107 of an electromagnet device 108. The contact point 106 is connected through a battery 109, or other source of electrical current, to a binding post 110 of the electromagnet device 108 so that, when the minute hand 101 contacts the point 106, while the hour hand contacts one of the points 103, 104, and 105, the electromagnetic windings 111 are energized, thereby attracting a contact point 112 of arm 114 to the metal core 113 of the magnet and swinging the arm 114 about its pivot point 115 downwardly against an arm 116 of a mercury switch 117. The mercury switch is pivoted about an axis 118 and contains electric contact points 119 and 120 which are connected to the motor circuit 121. When the mercury in the switch 117 makes connection between the contact points 119 and 120, the motor circuit is closed and the motor 53 is thrown into operation. This mechanism therefore starts the motor at predetermined intervals of time when the clock hands contact the various points on the clock face.

With the motor 53 in operation, the crank-arms 79, and 52 are rotated thus driving the paddles, brush and feed hopper. The last paddle 30 in the feed trough 14 is provided with an electrical contact member 125 as shown in Figure 10. This contact member is so weighted that the last paddle 30 normally assumes a position away from the vertical as shown in Figure 10. When feed is advanced to the last paddle, however, and piled up in front of the paddle it, at the right Fig. 10, of course, pushes the paddle into a vertical position as shown in dotted lines in Figure 10. In this position, the contact member 125 contacts, with another member 126 thereby completing an electric circuit, through the anti-roosting wire 8, from the battery 109 to the binding post 127 of the electromagnet device 108. This closed circuit energizes the electromagnet 128, thereby attracting the metal contact point 129 against the steel core 130 and moving the pivot arm 131 about its pivot 132 so as to force the mercury switch upward and break the contact between the points 119 and 120, thereby stopping the motor 53. The apparatus is thus shut off for a predetermined time, such as, for example, four hours as shown on the clock face until the clock hands again make contact to energize the electromagnet 111. In the meantime the animals in the pen, have eaten the food piled ahead of the paddle so that this paddle is no longer in a vertical position and when the mechanism is thrown into operation the contact point 125 will not contact the point 126 until additional food has been distributed along the full length of the trough to and including the last paddle 30 therein by a subsequent cycle of movement.

In case the last paddle 30 fails to operate to stop the motor after feed has been distributed throughout the pens, a safety stop device automatically stops the motor after a one-hour run. This device is merely an added circuit formed by placing contact points 140, 141 and 142 on the clock face at the 1, 5 and 9 hour marks or one hour later than the points 103, 104, and 105. The points 140, 141 and 142 are connected to the binder post 127 so that when the hour hand 102 contacts one of these points while the minute hand contacts point 106, a circuit through the battery 109 and coil 128 is completed to draw the metal contact 129 against the core 130 and tip the mercury switch upward, thereby stopping the motor 53.

I am aware that many changes may be made and numerous details of construction may be varied through a wide range without departing from the principles of this invention, and I, therefore, do not purpose limiting the patent granted hereon, otherwise than is necessitated by the prior art.

I claim as my invention:

1. In a feed distributing system for use in an animal house, a feed trough extending along one side of said house, tracks formed on the edges of said trough, a draw bar slidable on one of said tracks, paddles at spaced intervals in said trough, supporting means for each of said paddles secured at one end to said draw bar, roller means on the other end of some of the supporting means adapted to roll on the other track, a feed tank for supplying feed to said trough, and means for reciprocating said draw bar to move the paddles and distribute feed along the trough.

2. In a feed supply apparatus for poultry houses, in combination, a feeder tank for mash and scratch feeds, a pair of troughs below said tank and extending throughout the length of the poultry house, a chute for directing mash feed from said tank to one of said troughs, a second chute for directing scratch feed from said tank to the other of said troughs, pusher paddles at spaced intervals in said troughs, a draw bar slidable on the outside edge of one of said troughs, pivotal supporting means for said paddles secured at one end to said draw bar, and means to reciprocate said draw bar and paddles for advancing the mash and scratch feeds in their respective troughs.

3. In an animal feed distribution system including an animal pen, a trough extending along said pen, means for supplying feed locally to said trough, means for distributing feed along said trough, means responsive to the depth of the feed at the remote end of said trough for stopping said feed distributing means, and means for restarting said feed distributing means at predetermined intervals.

4. A feed tank for a distribution system of the type described comprising a stand, a hopper suspended therefrom, a base secured to said stand spaced from the bottom of said hopper, a sealing ring positioned between said base and hopper, an open-ended platform extending from said base at one side thereof in communication with the interior of said hopper, means for oscillating said hopper relatively to said base and means for feeding material from the hopper through the open end of said platform as said hopper is oscillated.

5. A feed tank for a distribution system of the class described comprising, in combination, a cylindrical tube, means for suspending said tube, a base having an upturned flange circumscribing the bottom of said tube, means for supporting said base in spaced relation from said tube, a pusher plate extending through an opening in the bottom of said tube, an open-ended platform integral with said base, and means for oscillating said tube and pusher plate relatively to said base for forcing material from within the tube outwardly onto the platform.

6. A feed tank for dispensing two types of feed comprising, in combination, a stand, a base supported on said stand and having an upturned flange, a vertical supporting member extending upwardly from the center of said base, a cylindrical tube oscillatably mounted on said supporting member in spaced relation from said base, a sealing ring in spaced relation from said flange on the base for cooperation with the bottom of the cylindrical tube, an open-ended platform extending from one side of said base, a dividing plate extending through said tube and cut of an opening in the lower portion thereof providing discharge apertures, gates on said tube for varying the size of the apertures, and means for oscillating said tube relatively to said base for discharging feed from the tube out of the ends of said platform.

7. In a feed distribution system, in combination, feed troughs, means for advancing feed through said troughs comprising a plurality of pusher paddles suspended in said troughs in spaced relation having their bottom edges spaced from the bottom of the troughs, a draw bar for moving said paddles, and means for oscillating said draw bar.

tion, feed troughs, pusher means for advancing feed through said troughs, a device for moving said means comprising U-shaped draw bars slidable on an edge of one of said troughs, roller means for supporting said draw bars and means for oscillating said draw bars relatively to said troughs.

9. An automatic feed distribution system comprising, in combination, a feed trough, feed supply means positioned at one end of said trough, a plurality of pusher paddles suspended at spaced intervals in said trough having their bottom edges terminating short of the bottom of said trough, an electrical contact point on the last paddle in said trough, a draw bar slidable on said trough for moving said paddles, driving means for said draw bar, a time clock for energizing said driving means at predetermined intervals, an electrical contact point for cooperating with the contact on the last paddle when said paddle reaches the end of its pushing stroke while driving a load of feed, and an electric switch for deenergizing the motor when the contact point on the last paddle contacts its cooperating point, whereby the device is automatically started by the time clock at predetermined intervals and automatically stopped when proper amount of feed is collected in front of the last pusher paddle.

10. An electric control system for a feed distributing unit comprising, in combination, a motor for driving said unit, a time clock for energizing said motor at fixed time intervals, and a feed controlled device for deenergizing said motor when the proper amount of feed has been distributed throughout the trough.

EDWARD H. RAYMOND.

CERTIFICATE OF CORRECTION.

Patent No. 2,043,595. June 9, 1936.

EDWARD H. RAYMOND.

It is hereby certified that error appears in the printed specification of the above numbered patent requiring correction as follows: Page 5, second column, before present line 1, insert the following:

8. In a feed distribution system, in combina-;

and that the said Letters Patent should be read with this correction therein that the same may conform to the record of the case in the Patent Office.

Signed and sealed this 8th day of September, A. D. 1936.

Leslie Frazer (Seal)  Acting Commissioner of Patents.